June 29, 1937.   J. D. McKIERNAN   2,085,112
TEMPLATE FOLLOWER FOR TORCH CARRIAGES
Filed June 20, 1935
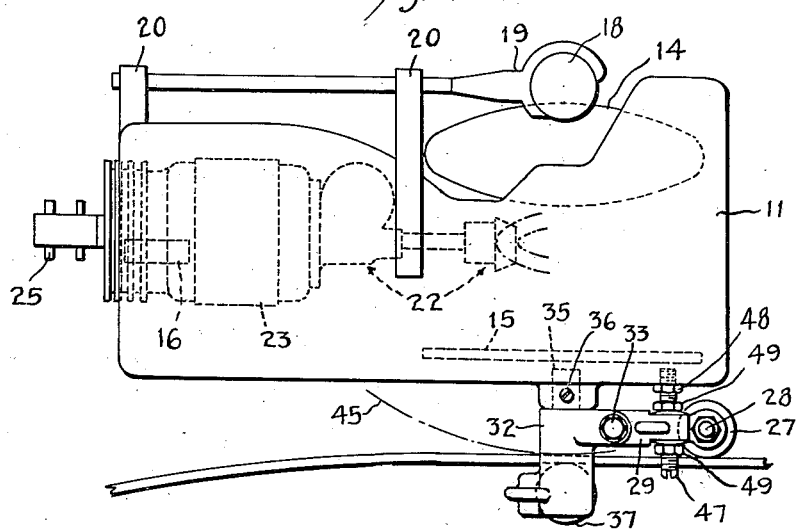
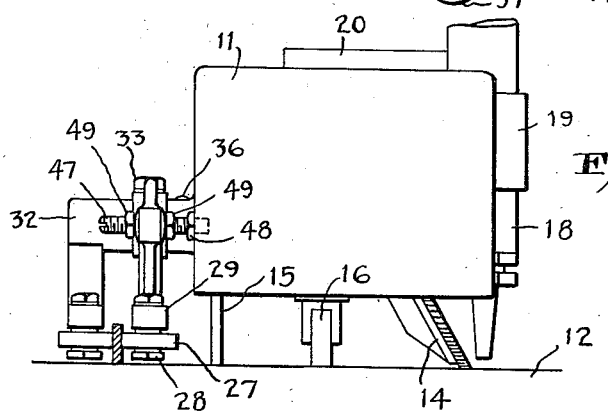
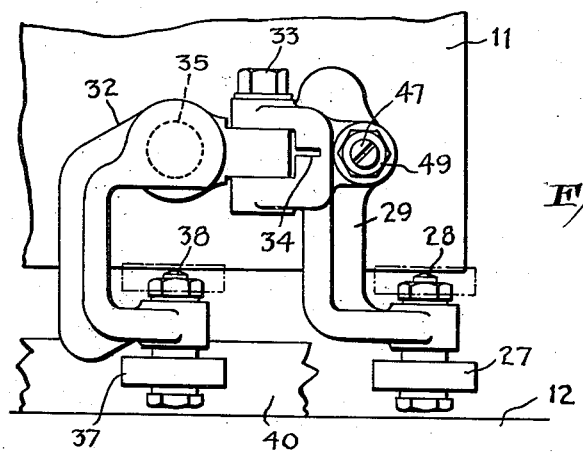
INVENTOR
James D. McKiernan
BY
ATTORNEY Patented June 29, 1937

2,085,112

UNITED STATES PATENT OFFICE 2,085,112

TEMPLATE-FOLLOWER FOR TORCH CARRIAGES

James D. McKiernan, Brooklyn, N. Y., assignor to Air Reduction Company, Incorporated, New York, N. Y., a corporation of New York Application June 20, 1935, Serial No. 27,482

9 Claims. (Cl. 266—23)

This invention relates to cutting or welding apparatus, and particularly to the guiding of torch carriages from templates.

The invention is primarily intended for that type of torch carriage which has one driving wheel and a number of idler wheels stably supporting the carriage on the work or some other surface. By employing one driving wheel only, and by swiveling or otherwise arranging the idler wheels so that they do not interfere with the turning movement, such carriages are made capable of turning sharply about the point of traction of the driving wheel as a center without requiring any of the wheels to slip. The speed of the driving wheel across the work, or other supporting surface, and the movement of a torch supported close to the driving wheel may be kept substantially uniform because their speed is influenced very little, or not at all, by turning of the carriage.

Torch carriages of this type are ordinarily hand guided, and the facility with which they change their course has made mechanical means for guiding them somewhat complicated and expensive. Although this invention provides means by which torch carriages of the character indicated are guided with simple apparatus from inexpensive templates, it will be understood that in its broader aspects the invention is not limited to such carriages and that features of the invention relate to torch carriages in general.

It is an object of the invention to provide a torch carriage with improved means for guiding it from a template. The invention operates with templates of simple and inexpensive construction which can be placed directly on the work to guide a torch carriage as it travels across the work.

Another object of the invention is to provide template-follower roller means which can be easily connected to hand-guided torch carriages to adapt them for guidance from a template. The invention is suitable for guiding torch carriages of the class having a single driving wheel, as well as various other types of carriages the direction of movement of which is somewhat more easily controlled.

Other objects, features and advantages of the invention will appear or be pointed out as the specification proceeds.

In the accompanying drawing, forming a part hereof:

Fig. 1 is a top plan view of a torch carriage and guide means embodying the invention;

Fig. 2 is an end elevation of the structure shown in Fig. 1; and

Fig. 3 is an enlarged side elevation of the guide means and portions of the torch carriage and template.

The torch carriage has a frame or body 11 with wheels supporting it for movement over the work 12, or other surface. The wheels include a driving or traction wheel 14 and idler wheels 15 and 16. The wheel 15 is located with its axis of rotation in the same plane with the axis of rotation of the driving wheel 14 so that the idler wheel 15 does not interfere with the turning of the carriage about the point of traction of the wheel 14 as a center. The idler wheel 16 is a caster wheel and rolls in any direction necessary as the carriage turns. The invention may be embodied in carriages having more or fewer wheels than shown in the drawing.

The driving wheel is sloped and dished to permit its point of traction to be located close to the point at which the jet from an oxygen cutting torch 18 strikes the work, so that the torch and driving wheel move along substantially the same path and at the same speed, in spite of curves in the path followed. The torch 18 is connected to the carriage by a torch holder 19 and brackets 20 which can be adjusted to change the spacing of the torch from the driving wheel. A welding torch can be substituted for the cutting torch 18, and the bracket 20 can be adjusted to increase the distance between the weld and the driving wheel to prevent the wheel from touching the molten metal.

The driving wheel 14 is connected by gearing 22 with an electric motor 23. The motor is equipped with a governor having a speed adjustment knob 25 at one end of the machine.

A roller 27 is supported at one side of the torch carriage by an axle 28 connected to a bracket 29. This bracket has a bifurcated end connected with a second bracket or support 32 by a screw 33 which forms a pivot connection between the brackets when released and rigidly connects the brackets when tightened. The screw 33 threads into the lower bifurcation of the bracket 29, and the bracket has a slot 34 to give it sufficient flexibility to clamp the support 32 when the screw 33 is tightened. The support 32 is rigidly connected to the carriage body by a stem 35 which extends into the same opening that is used to receive the radius rod for guiding the torch carriage in cutting or welding circles. A set-screw 36 holds the stem 35 in the radius rod socket.

A roller 37 has an axle 38 connected with the support 32. The rollers 27 and 37 are spaced substantially the same distance from the work and when these rollers are in the full-line positions shown in the drawing they are close enough to the surface of the work to contact with the side faces of a low template 40 which may be clamped or otherwise secured to the work 12.

If a higher template is used and it is desirable to have the rollers 27 and 37 spaced further from the work in order to clear fastening means or the horizontal leg of an angle template, the axles 28 and 38 can be inserted into the bracket 29 and support 32 from the top instead of from the bottom, and the rollers 27 and 37 will be located in the positions indicated by dot-and-dash lines in Fig. 3.

The carriage is driven entirely from one side and therefore tends to travel in a circle. The roller 27 is preferably located near the forward end of the carriage body, and as the carriage tends to turn clockwise in Fig. 1 the roller 27 bears against the near side of the template and holds the forward end of the carriage spaced therefrom. The roller 37 contacts with the far side of the template and prevents the rearward end of the carriage from moving away from the template.

The roller 37 preferably contacts with the template 40 at a point which lies in the same plane with the axis of rotation of the driving wheel 14. This relation of the roller 37 and driving wheel 14 makes the roller resist turning of the torch carriage in either direction, about the point of traction of the wheel 14, if the roller 37 contacts with the template at the point where a circle 45, about the point of traction as a center, is tangent to the far side of the template. When such is the case, any effort of the torch carriage to turn in either direction about the point of traction of the driving wheel as a center causes the roller 37 to be pressed more firmly against the template.

The spacing of the roller 27 from the carriage body is determined by a screw 47 which extends through the bracket 29 and threads into the side of the body 11. A lock nut 48 on the screw 47 clamps against the carriage body. The bracket opening through which the screw 47 extends has considerable clearance around the screw so that this opening need not be in alinement with the screw 47, but the bracket 29 and screw 47 are rigidly connected by nuts 49 which are threaded on the screw and clamp against curved faces on opposite sides of the bracket 29.

The angular relation of the carriage and the template, when both rollers 27 and 37 are in contact with the template, depends upon the spacing of the roller 27 from the body of the torch carriage. The nuts 49 are preferably adjusted on the screw 47 to shift the bracket 29 and the roller 27 to change the position of the carriage until the point of contact of the roller 37 with the template coincides with the point of tangency of the circle 45 and the outside face of the template.

The tendency of the torch carriage to travel with a component of lateral movement toward the template is affected by the angular relation of the carriage with respect to the template. If the carriage is facing in such a direction that movement straight forward would bring it closer to the template then this bias of the carriage will be added to that produced by the location of the single driving wheel on one side and will increase the tendency of the carriage to move toward the template so that the rollers bear against the template with greater force and the carriage can travel around template curves of shorter radius. The means for adjusting the spacing of the roller 27 from the carriage body to change the angular relation of the torch carriage and the template comprises, therefore, means for changing the bias of the carriage. The bias of the carriage can be controlled with the same effect by making the roller 37 adjustable to change its spacing from the carriage body.

The roller 27 prevents clockwise rotation of the carriage around the point of contact of the roller 37 with the template. The rotation of the rollers 27 and 37 is not essential, but bearing surfaces which skid along the template have greater friction than the rotating rollers 27 and 37 and do not obtain such smooth operation of the carriage.

The invention has been described as embodied in a special type of torch carriage, but it will be apparent that it is not limited to that type of carriage or to the embodiment illustrated, and that features of the invention may be used without others.

I claim:

1. Cutting or welding apparatus comprising a torch carriage having several wheels stably supporting it for movement on a supporting surface, a vertically extending template for guiding the course of the carriage across its supporting surface, means tending to move the carriage toward the template, and roller means supported on vertically extending axes and contacting with both sides of the template to maintain the carriage in the desired relation to the template.

2. Cutting or welding apparatus including a wheeled torch carriage with means for causing it to travel in a circle on the work or other supporting surface when not guided, and roller means connected with the carriage and located at the side of the carriage toward which it turns when free to travel in a circular path, said roller means being in position to contact with both sides of a template to cause the carriage to follow along the template as a guide.

3. A self-propelled torch carriage comprising a body having wheels for supporting it on the work or other supporting surface, including a single driving wheel, said driving wheel being located at one side of the carriage, means on the other side of the carriage for contact with a template, said means including vertically extending axles connected with the carriage body, and rollers on said axles constructed and arranged to guide the carriage body from the template so that the driving wheel causes the carriage to travel over the supporting surface along a path corresponding to the outline of the template.

4. Cutting or welding apparatus comprising a self-propelled torch carriage for traveling on the work or other surface, means biasing the carriage so that it tends to move along a course leading toward a guiding template extending along one side of the carriage, roller means connected to the carriage and contacting with both sides of the template to guide the carriage from the template, and means operable to change the bias of the carriage.

5. The combination with a torch carriage having wheels for moving it across a supporting surface, of means connected with the carriage and contacting with opposite faces of an upstanding template extending along said supporting surface to cause the carriage to follow along the template, each of said means contacting with only one side of the template, and adjustable means for urging the carriage to change its course to one leading toward the template.

6. The combination with a torch carriage having wheels stably supporting it for movement in any and changing directions on the work or other supporting surface, and means for driving one of said wheels, of a bracket connected with the carriage and having a portion adapted to extend over a template, a roller rotatably supported by the bracket in position to contact with the side of the template away from the carriage at a point in a vertical plane with the axis of the driving wheel, and another roller supported by the carriage in position to contact with the near side of the template to hold one end of the carriage in spaced relation with the template.

7. The combination with a torch carriage having wheels stably supporting it for movement in any and changing directions on the work or other supporting surface, and means for driving one of said wheels, of a bracket connected with the carriage in position to extend above and beyond a template, a roller rotatably supported by the bracket in position to contact with the far side of the template at the point of tangency of that side of the template with a circle about the point of traction of the driving wheel, and means for keeping the carriage in the desired spaced relation with the near side of the template.

8. Cutting or welding apparatus including in combination a torch carriage comprising a body portion, a driving wheel and at least two idler wheels under the body portion for supporting it for movement in any and changing directions over the work or other supporting surface, the driving wheel being located at one side of the carriage, a bracket on the other side of the carriage, a roller supported by the bracket for rotation in a plane at right angles to the carriage-supporting surface, said roller being spaced from the side of the carriage and located below the adjacent portion of the bracket for contact with a template on the side of the template away from the carriage and at a point in the same plane with the axis of rotation of the driving wheel, and another roller connected with the carriage in position to contact with the near side of the template at a point ahead of the first roller in the direction of movement of the carriage when the carriage is at such an angular relation to the template that the driving wheel tends to move the forward end of the carriage toward the template as the carriage travels along the template.

9. The combination with a torch carriage having wheels stably supporting it for movement in any and changing directions on the work or other supporting surface, and means for driving one of said wheels, of a bracket connected with the carriage and having a portion adapted to extend over a template, a roller rotatably supported by the bracket in position to contact with one side of the template, and another roller supported by the carriage in position to contact with the other side of the template, one of said rollers being so located that its point of contact with the template is in a vertical plane with the axis of the driving wheel.

JAMES D. McKIERNAN.